(12) United States Patent
Van Dusen et al.

(10) Patent No.: US 12,096,054 B2
(45) Date of Patent: *Sep. 17, 2024

(54) SYSTEMS AND METHODS FOR BANDWIDTH-LIMITED VIDEO TRANSPORT

(71) Applicant: Biamp Systems, LLC, Beaverton, OR (US)

(72) Inventors: Charles H. Van Dusen, Wilsonville, OR (US); Christopher R. Wulff, Greece, NY (US); Brian D. Nelson, Newberg, OR (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,450

(22) Filed: Sep. 5, 2023

(65) Prior Publication Data

US 2023/0412860 A1    Dec. 21, 2023

Related U.S. Application Data

(63) Continuation of application No. 17/584,317, filed on Jan. 25, 2022, now Pat. No. 11,750,863, which is a
(Continued)

(51) Int. Cl.
*H04N 21/24* (2011.01)
*H04N 21/234* (2011.01)
(Continued)

(52) U.S. Cl.
CPC ....... *H04N 21/2402* (2013.01); *H04N 21/234* (2013.01); *H04N 21/234363* (2013.01);
(Continued)

(58) Field of Classification Search
None
See application file for complete search history.

(56) References Cited

U.S. PATENT DOCUMENTS

| 5,337,153 A | 8/1994 | Takayama |
| 5,703,646 A | 12/1997 | Oda |

(Continued)

FOREIGN PATENT DOCUMENTS

| EP | 0790741 A3 | 5/2000 |
| WO | 2015184416 A1 | 12/2015 |

OTHER PUBLICATIONS

Fankhauser et al., "Wavevideo—an Integrated Approach to Adaptive Wireless Video", Mobile Networks and Applicaitons, ACM, New York, NY, US, Vo.. 4 No. 4, Dec. 1, 1999, pp. 255-271, XP001195491.

(Continued)

*Primary Examiner* — An Son P Huynh

(57) ABSTRACT

Systems and methods for bandwidth-limited video transport are configured to receive (or otherwise discern) a selection of video parameter limits that correspond to a bandwidth limit and apply the video parameter limits to an input video stream to enforce the bandwidth limit while preserving video quality. Methods may include adjusting the video stream one parameter at a time until the adjusted video stream meets the bandwidth limit. Parameters to be adjusted may include image resolution, frame rate, image compression, color depth, bits per pixel, and/or color encoding. In some embodiments, the image resolution is reduced first, the frame rate is reduced next, and the image compression is increased last. The extent and/or order of the adjustments of the parameters may be selected by the user, based on the content of the video stream, and/or based on the bandwidth limit.

20 Claims, 5 Drawing Sheets

Related U.S. Application Data continuation of application No. 17/172,038, filed on Feb. 9, 2021, now Pat. No. 11,234,030, which is a continuation of application No. 16/890,987, filed on Jun. 2, 2020, now Pat. No. 10,917,676, which is a continuation of application No. 16/286,514, filed on Feb. 26, 2019, now Pat. No. 10,674,190, which is a continuation of application No. 15/610,056, filed on May 31, 2017, now Pat. No. 10,219,014.

(60) Provisional application No. 62/344,600, filed on Jun. 2, 2016.

(51) Int. Cl.
   *H04N 21/2343* (2011.01)
   *H04N 21/235* (2011.01)
   *H04N 21/238* (2011.01)
   *H04N 21/4402* (2011.01)
   *H04N 21/442* (2011.01)
   *H04N 21/485* (2011.01)
   *H04N 21/6373* (2011.01)

(52) U.S. Cl.
   CPC . *H04N 21/234381* (2013.01); *H04N 21/2353* (2013.01); *H04N 21/238* (2013.01); *H04N 21/440281* (2013.01); *H04N 21/44209* (2013.01); *H04N 21/4858* (2013.01); *H04N 21/6373* (2013.01)

(56) References Cited

U.S. PATENT DOCUMENTS

| | | | |
|---|---|---|---|
| 5,761,398 A | 6/1998 | LeGall | |
| 5,872,598 A | 2/1999 | LeGall et al. | |
| 6,233,017 B1 | 5/2001 | Chaddha | |
| 6,981,045 B1 | 12/2005 | Brooks | |
| 7,778,326 B1* | 8/2010 | Chen | H04N 21/26216 370/468 |
| 7,809,061 B1 | 10/2010 | Sarna | |
| 7,958,532 B2 | 6/2011 | Paul et al. | |
| 2002/0157112 A1 | 10/2002 | Kuhn | |
| 2003/0012279 A1 | 1/2003 | Chaddha | |
| 2003/0103563 A1* | 6/2003 | Amini | H04N 19/115 375/240 |
| 2003/0118243 A1 | 6/2003 | Sezer et al. | |
| 2005/0147309 A1 | 7/2005 | Katata et al. | |
| 2006/0171468 A1 | 8/2006 | Costa et al. | |
| 2007/0094698 A1 | 4/2007 | Bountour et al. | |
| 2007/0157260 A1 | 7/2007 | Walker | |
| 2008/0037525 A1 | 2/2008 | Karaoguz et al. | |
| 2009/0241147 A1 | 9/2009 | Kim et al. | |
| 2009/0249413 A1 | 10/2009 | Karaoguz et al. | |
| 2010/0278271 A1 | 11/2010 | MacInnis | |
| 2010/0303094 A1 | 12/2010 | Chen et al. | |
| 2010/0322302 A1 | 12/2010 | Rodriguez et al. | |
| 2011/0261889 A1 | 10/2011 | Francisco | |
| 2011/0285860 A1 | 11/2011 | Huang et al. | |
| 2012/0159000 A1 | 6/2012 | Diab | |
| 2013/0067524 A1 | 3/2013 | Andrews et al. | |
| 2014/0115128 A1* | 4/2014 | Myrberg | G06F 9/5061 709/221 |
| 2014/0282787 A1 | 9/2014 | Wirick et al. | |
| 2015/0020135 A1 | 1/2015 | Frusina et al. | |
| 2015/0135234 A1 | 5/2015 | Hall | |
| 2015/0163496 A1 | 6/2015 | Singer et al. | |
| 2015/0201193 A1 | 7/2015 | Gu et al. | |
| 2015/0222849 A1 | 8/2015 | Kang et al. | |
| 2015/0286875 A1 | 10/2015 | Land et al. | |
| 2015/0365688 A1 | 12/2015 | Su et al. | |
| 2016/0248989 A1 | 8/2016 | Cross | |
| 2017/0078447 A1* | 3/2017 | Hancock | H04N 21/4424 |
| 2017/0195672 A1 | 7/2017 | He et al. | |

OTHER PUBLICATIONS

Hsiao et al., "Multimedia home environment streaming system design", Consumer Electronics (ISCE), 2013 IEEE 17th International Symposium on, IEEE, Jun. 3, 2013, pp. 81-82, XP032443882.

Yi-Hau Chen et al: "Bandwidth-Efficient Encoder Framework for H.264/ AVC Scalable Extension", Multimedia Workshops, 2007. ISMW '07. Ninth IEEE International Symposium on, IEEE, Piscataway, NJ, USA, Dec. 10, 2007 (Dec. 10, 2007-), pp. 401-406, XP031239190.

Yu Wang et al: "Spatial resolution decision in scalable bitstream extraction for network and receiver aware adaptation", Multimedia and Expo, 2008 IEEE International Conference on, IEEE, Piscataway, NJ, USA, Jun. 23, 2008 (Jun. 23, 2008), pp. 577-580, XP032965357,DOI: 10.1109/ICME.2008.4607500ISBN: 978-1-4244-2570-9.

* cited by examiner

SYSTEMS AND METHODS FOR BANDWIDTH-LIMITED VIDEO TRANSPORT

FIELD

The present disclosure relates to systems and methods for bandwidth-limited video transport.

BACKGROUND

Video conferencing, streaming, and broadcasting generally include digital video transport over a communications channel such as dedicated cable, a wireless connection, or the Internet. Especially for video conferencing, streaming, and broadcasting, video transport systems are configured to provide the transmitted video stream(s) substantially 'live' or in real time, without significant interruption of the video stream(s). Video transport systems may be configured to transmit video, audio, and other media (e.g., graphics, data, metadata), and may be referred to as media transport systems.

Communications channels have a limited bandwidth and the bandwidth limit may impact the transmission of video, especially if multiple channels of high quality video are desired. Traditional solutions to manage bandwidth include limiting the number of video streams transmitted and/or limiting the type and/or quality of video streams. Typically bandwidth is restricted by rejecting video streams with too high of a bandwidth demand and/or adjusting the high demand video stream to a lower bandwidth stream. Video parameters such as image resolution (the image height, image width, and number of pixels), frame rate, compression, color depth, and color encoding format, affect the bandwidth demand of a video stream. Lower image resolution, lower frame rate, higher compression, lower color depth, and simpler color encoding (e.g., 4:2:0 $Y':C_b:C_r$ encoding or grayscale only) may reduce the bandwidth requirements of a video stream. But, reducing bandwidth through these parameters also reduces the quality of the video stream.

Traditionally, a user configures a video transport system for a balance between bandwidth demand and video quality on a per-video-source basis. If the video source changes (presenting different video parameters), the balance may be disturbed and the video transport system may need to be reconfigured. For a dynamic system with variable video sources and/or adept video routing, the user may need to set the video parameters to accommodate the highest demand video stream at the expense of video quality for any other video streams. Setting parameters for the highest demand stream may waste bandwidth for other (potentially less critical) streams. Setting parameters for the lowest demand (or even typical demand) may compromise quality of the higher demand streams. Additionally, users of video transport systems may not recognize the optimal way to preserve video quality while adjusting video parameters for a particular video stream or a range of video stream types.

SUMMARY

Systems and methods for bandwidth-limited video transport are configured to receive a selection of video parameter limits from a user that correspond to a bandwidth limit and apply the video parameter limits to an input video stream to enforce the bandwidth limit while preserving video quality. Additionally or alternatively, the systems and methods may be configured to discern the bandwidth limit and/or the video parameter limits without user direction.

A method for enforcing a bandwidth limit in a video transport system may include determining whether an input video stream needs adjustment to meet the bandwidth limit. If the input video stream is over the bandwidth limit, the video stream may be adjusted one parameter at a time until the adjusted video stream is equal to or less than the bandwidth limit. Parameters to be adjusted may include image resolution, frame rate, image compression, color depth, bits per pixel, and/or color encoding. In some embodiments, the image resolution is reduced first, the frame rate is reduced next, and the image compression is increased last. The extent and/or order of the adjustments of the parameters may be selected by the user, based on the content of the video stream, and/or based on the bandwidth limit.

DESCRIPTION

Figure 1:
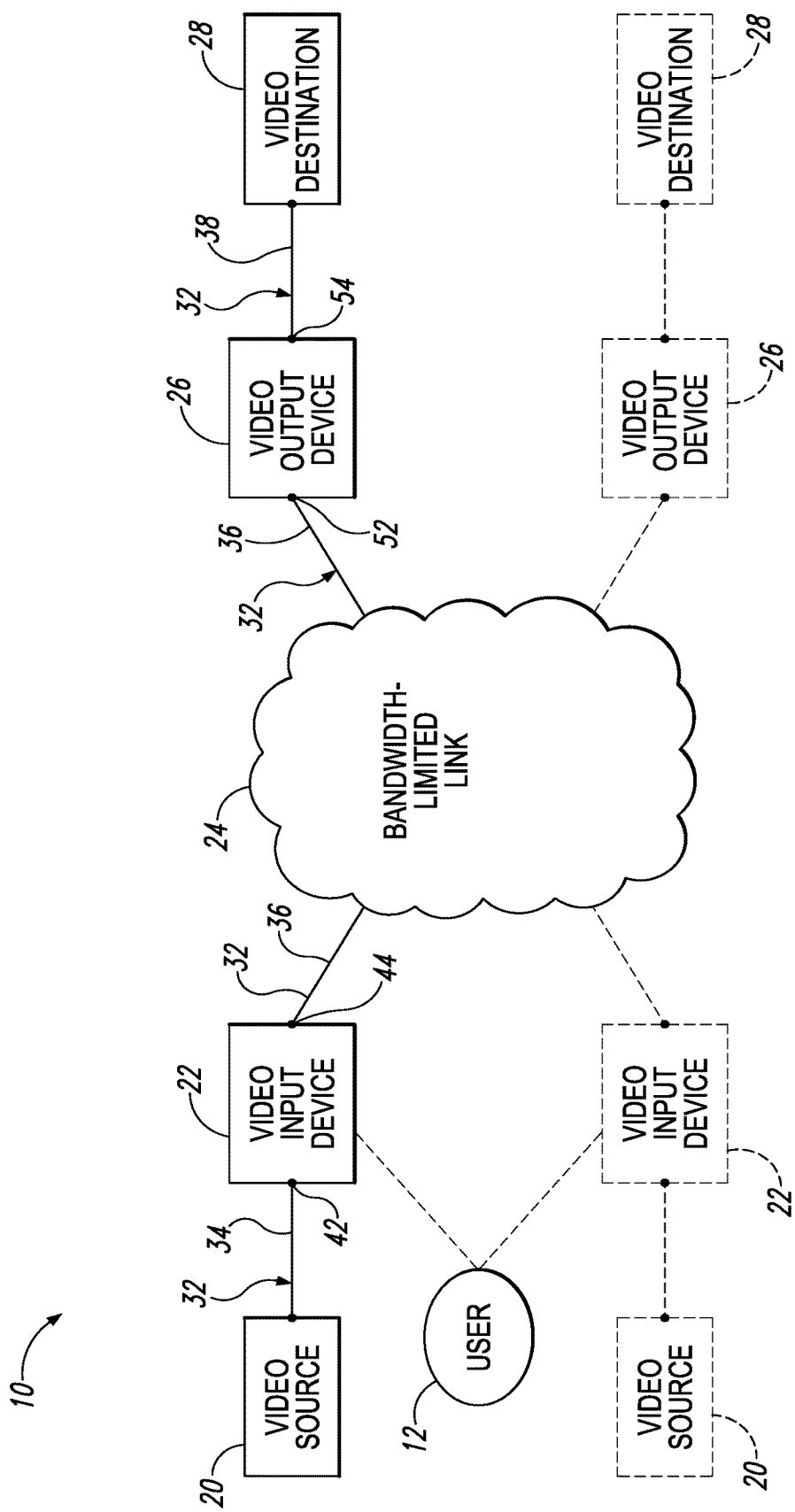
FIG. 1 is a schematic representation of a video transport system according to the present disclosure.

FIGS. 1-5 illustrate systems and methods for bandwidth-limited video transport. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a schematic representation of a video transport system 10 (also called a bandwidth-limited video transport system). The video transport system 10 includes a video source 20, a video input device 22, a bandwidth-limited link 24, a video output device 26, and a video destination 28. The video transport system 10 may be part of, and/or integrated with, a media transport system (which transports video and other forms of media such as audio). In the video transport system 10, the video source 20 generates (or sources) a video stream 32 that is referred to as an input video stream 34. The input video stream 34 is connected to the video input device 22, which adjusts the input video stream to form another video stream 32 that is a bandwidth-limited video stream 36. The bandwidth-limited video stream 36 is connected to the video output device 26 via the bandwidth-limited link 24. The video output device 26 receives the bandwidth-limited video stream 36 and forms another video stream 32 that is an output video stream 38. The output video stream 38 is connected to the video destination 28 which receives (or consumes) the output video stream 38.

The video transport system 10 may include multiple video sources 20, multiple video input devices 22, multiple bandwidth-limited links 24, multiple video output devices 26, and/or multiple video destinations 28. A single video source 20 may transmit one or more video streams 32 to multiple video input devices 22 (e.g., one video stream 32 to many devices or a different video stream 32 for each device). A single video input device 22 may receive video streams 32 from multiple video sources 20 and may transmit one or more video streams 32 to one or more video output devices 26. Video streams 32 may be transported through one or more bandwidth-limited links 24 (e.g., one bandwidth-limited link 24 for all bandwidth-limited video streams 36 or different bandwidth-limited links 24 for different bandwidth-limited video streams 36). A single video output device 26 may receive video streams 32 from multiple video input devices 22 and may transmit one or more video streams 32 to one or more video destinations 28 (e.g., one video stream 32 to many video destinations 28 or a different video stream 32 for each video destination 28). A single video destination 20 may receive one or more video streams 32 from multiple video output devices 26.

The video source 20 is a device that generates, reproduces, stores and/or transfers the input video stream 34 to the video input device 22. For example, the video source 20 may include, and optionally may be, a camera, a receiver (e.g., an audio-video receiver, a satellite receiver), a video decoder, a media server (e.g., a video server), a media player (e.g., a video player, a DVD player), and/or a streaming media device (e.g., a streaming video device).

The video streams 32 generally are digital video signals conveying video content. The video streams 32 may include other content such as associated audio, closed captioning, time codes, secondary video content, and/or metadata related to the video content. If the video stream 32 includes video content and other content, the video stream 32 may be referred to as a composite video stream. The video stream 32 may be transferred between devices using a digital communication protocol and/or interface (e.g., HDMI (High-Definition Multimedia Interface), SDI (Serial Digital Interface), DisplayPort, USB (Universal Serial Bus), FireWire (IEEE 1394), IP (Internet Protocol), UDP (User Datagram Protocol), TCP (Transmission Control Protocol), RTP (Real-time Transport Protocol), AES67 (Audio Engineering Society), and AVB (Audio Video Bridging)). The input video stream 34 and/or the output video stream 38 may include and/or may be analog video signals sourced and/or received by the respective video source 20 and/or video destination 28. Analog signals may be converted to digital signals by an analog to digital converter (and vice versa by a digital to analog converter).

Video streams 32 may be directed between the video source 20, the video input device 22, the video output device 26, and/or the video destination 28 by a physical communications channel (e.g., wired or wireless connection). Additionally or alternatively, video streams 32 may be transported via logical channels (also called ports) within a physical communications channel. For example, the communications channels may be digital network channels and/or ports configured according to various communications protocols such as TCP/IP and/or AVB.

The video input device 22 is a device that is configured to receive the input video stream 34 from the video source 20 and configured to adjust the input video stream 34 to fit within a bandwidth limit specified by a user 12 and/or a bandwidth limit of the bandwidth-limited link 24. The input video stream 34 as adjusted for the bandwidth limitations is the bandwidth-limited video stream 36. If the input video stream 34 is compatible with the bandwidth limit, the video input device 22 may transmit the input video stream 34 as the bandwidth-limited video stream 36. The video input device 22 also is configured to transmit the bandwidth-limited video stream 36 to the video output device 26 via the bandwidth-limited link 24. If the video input device 22 receives multiple input video streams 34, the video input device 22 may select an active (or selected) video stream 32 among the input video streams 34 for processing to produce the bandwidth-limited video stream 36. The video input device 22 may include a video selector, a video switch, and/or a video mixer to select the active input video stream 34. If the input video stream 34 is a composite video stream, the video input device 22 may extract and/or separate the video content from the composite video stream for processing to produce the bandwidth-limited video stream 36.

The bandwidth-limited link 24 is a physical and/or logical communications channel between the video input device 22 and the video output device 26. Generally, the bandwidth-limited link 24 is part of a video-capable network. The bandwidth-limited link may be a fixed or dynamic topology. For example, the bandwidth-limited link 24 may be a direct cable connecting the video input device 22 and the video output device 26. As another example, the bandwidth-limited link 24 may be a digital communication network between one or more video input devices 22 and one or more video output devices 26. The bandwidth-limited link 24 may be the entirety or a portion of an AVB network, a CobraNet network, and/or an AES67 network.

Communications channels (whether physical or logical), such as the bandwidth-limited link 24, have bandwidth limits (maximum capacity) beyond which communication is not possible or is significantly degraded. Logical ports may have independent bandwidth limits and/or all logical ports within a communications channel may have a shared bandwidth limit. The bandwidth-limited link 24 is a communications channel with a bandwidth limit generally less than the bandwidth limits of other communications channels in the video transport system 10. The user 12 may desire to restrict the bandwidth of the video stream 32 through the bandwidth-limited link 24 to a value below the maximum capacity of the bandwidth-limited link 24. The bandwidth of multiple video streams 32 that are to be transported through a single bandwidth-limited link 24 may be limited such that the total bandwidth consumed by the video streams 32 is less than the maximum capacity of the bandwidth-limited link 24. Additionally or alternatively, the bandwidth of one or more video streams 32 may be limited to permit (and/or reserve capacity for) other traffic in the same bandwidth-limited link 24. Using the systems and methods of the present disclosure, the user 12 may allocate a different bandwidth limit to each bandwidth-limited video stream 36 (e.g., bandwidth limits may be allocated on a per video stream basis). Video streams 32 with a higher bandwidth may be higher quality video streams 32 and/or a higher bandwidth limit may support a higher quality video stream 32.

The video output device 26 is a device that is configured to receive the bandwidth-limited video stream 36 from the video input device 22 and configured to adjust the bandwidth-limited video stream 36 to substantially reconstruct the input video stream 34 from the bandwidth-limited video stream 36. The bandwidth-limited video stream 36 as adjusted to reconstruct the input video stream 34 is the output video stream 38. The video output device 26 may configure the output video stream 38 for the video destination 28. For example, the output video stream 38 may be output with a fixed set of video parameters (e.g., image resolution, frame rate, color depth, color encoding format, etc.) and/or one or more video parameters associated with and/or preferred by the video destination 28.

The video destination 28 is a device that receives, renders (e.g., displays), stores, and/or transfers the output video stream 38 from the video output device 26. For example, the video destination 28 may include, and optionally may be, a video monitor, a personal computer, a mobile phone, a video projector, a receiver (e.g., an audio-video receiver), a video encoder, and/or a media server (e.g., a video server). The video destination 28 may receive content related to the video content of the output video stream 38 (e.g., audio). Related content may be transmitted in the output video stream 38 or transmitted to the video destination 28 via an alternate communications channel.

Figure 2:
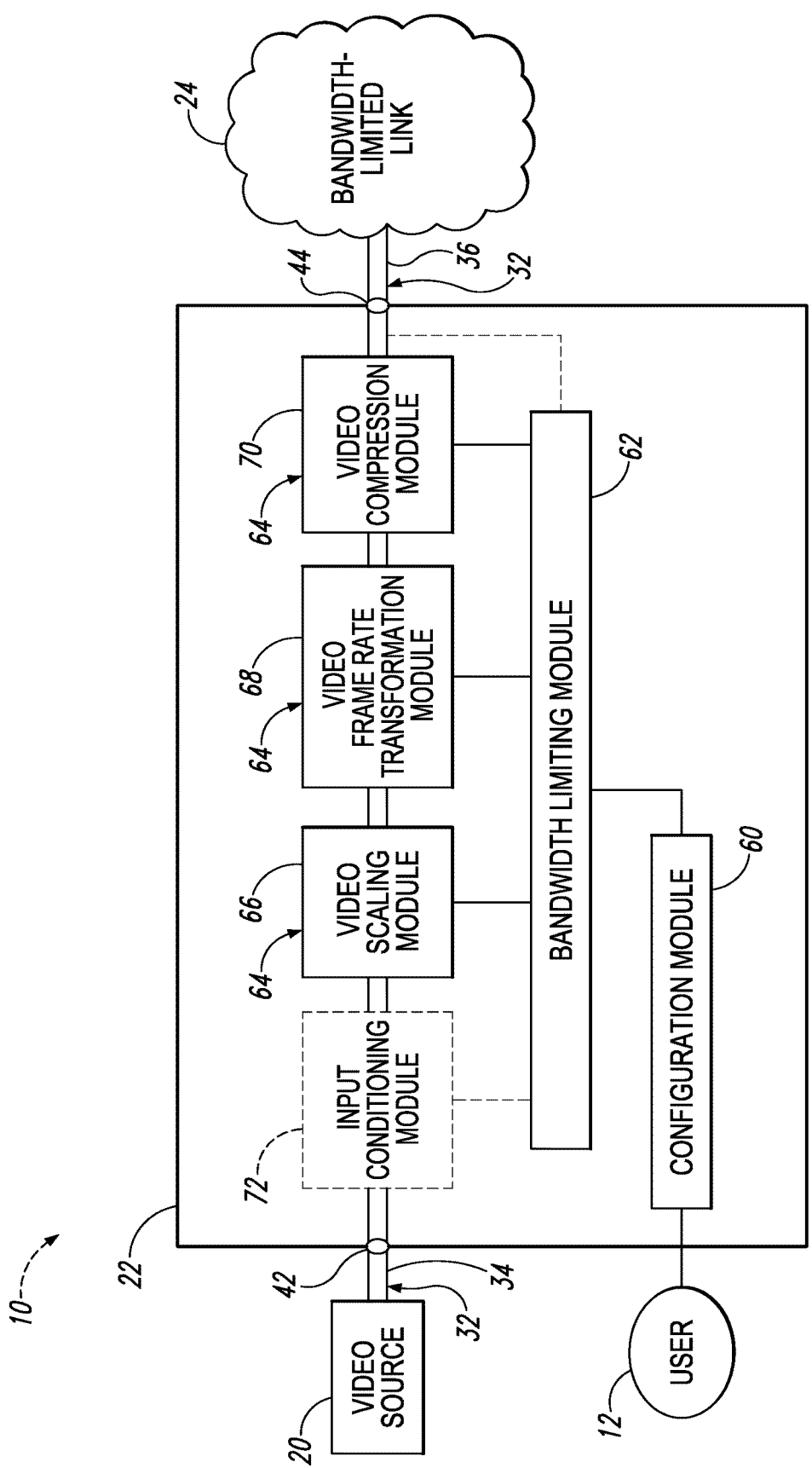
FIG. 2 is a schematic representation of a video input device in a video transport system according to the present disclosure.

FIG. 2 is a schematic representation of the video input device 22 of the video transport system 10. The video input device 22 includes a video input port 42, a video output port 44, and a facility to accept input from the user 12. For example, the video input device 22 may include a user interface to interact with the user 12 and/or a communications channel to receive a selection of video parameters and/or the bandwidth limit. In the video input device 22, video streams 32 that arrive at the video input port 42 are transferred (as optionally processed) to the video output port 44. The video input device 22 may include one or more video input ports 42 and/or one or more video output ports 44. Video streams 32 may be directed between any video input port 42 and any video output port 44. Video streams 32 may be processed within the video input device 22, multiple video streams 32 may be merged, and/or a video stream 32 may be replicated. Each video input port 42 and each video output port 44 independently may be a physical channel (e.g., a wired or wireless connection) or may be a logical port within a communications channel that utilizes a physical channel. For example, all video input ports 42 may be logical ports in a single communications channel. As another example, some video output ports 44 may be logical ports in a single communications channel and different video output ports 44 may be connected to different communications channels.

The incoming, active, or selected input video stream 34 of the video input device 22 may change during operation of the video transport system 10. For example, two video sources 20 with different video parameters may be connected such that each provides a respective input video stream 34 to the video input device 22. Either of the input video streams 34 may be selected as desired (e.g., by the video input device 22 or by a switch upstream of the video input device 22), resulting in varying video parameters presented to the video input device 22. Hence, the input video stream 34 operated on by the video input device 22 may change video parameters while the video transport system 10 is operating. The systems and methods of the present disclosure are configured to automatically adjust the video parameters of the bandwidth-limited video stream 34 to achieve the user-defined minimum video quality while maintaining the bandwidth limit. The video parameters may be adjusted selectively and/or to the extent needed to achieve the bandwidth limit. Hence, the systems and methods of the present disclosure are configured to substantially preserve video quality in an optimal or near optimal fashion while enforcing the bandwidth limit.

The systems and methods of the present disclosure do not rely on a priori knowledge of the content type of the input video stream. However, the systems and methods of the present disclosure may be configured to determine and/or use content type of the input video stream (e.g., live sports, video conference, presentation graphics, etc.) to further optimize the image quality while maintaining the output video stream under the output bandwidth limit.

In the example of FIG. 2, the video input device 22 includes several modules to automatically adjust the bandwidth of the input video stream 34 and to transmit the bandwidth-limited video stream 36 from the video output port 44. Modules include a configuration module 60, a bandwidth limiting module 62, and at least one video adjustment module 64 to adjust the video parameters of the video stream. Further, the video input device 22 may include an input conditioning module 72 upstream of the video adjustment module(s) 64 that is configured to condition the input video stream 34 before processing by the video adjustment module(s) 64.

As illustrated in the example of FIG. 2, the video adjustment modules 64 may include modules dedicated to performing independent adjustment to the video content of the input video stream 34, for example, a video scaling module 66 to scale the image resolution, a video frame rate transformation module 68 to transform the frame rate (also referred to as the image repetition rate), and/or a video compression module 70 to compress the video stream. Video adjustment modules 64 may adjust one or more video parameters. Different video adjustment modules 64 may each adjust different video parameters. Additionally or alternatively, two video adjustment modules 64 may adjust the same video parameter (typically in different manners or in conjunction with different combinations of video parameters).

Each video adjustment module 64 operates on a video stream input to that module, which may be referred to as a module operand video stream and a module input video stream. The module operand video stream of one of the modules may be the input video stream 34 (or the (conditioned) input video stream 34 as described further herein). Such a video adjustment module 64 would be the most upstream of the video adjustment modules 64. For example, the video scaling module 66 in the example of FIG. 2 is the most upstream of the adjustment modules 64, even though the video scaling module 66 may be downstream of the input conditioning module 72 (the module operand video stream of the video scaling module 66 would be the (conditioned) input video stream 34 output from the input conditioning module 72 as described further herein).

The input conditioning module 72, if present, is upstream of the video adjustment module(s) 64. The input conditioning module 72 accepts the input video stream 34 and produces a (conditioned) input video stream 34 that is input to the most upstream of the video adjustment modules 64. In an example configuration, the input conditioning module 72 may be an input decompression module that is configured to decompress the input video stream 34 to produce an (uncompressed) input video stream 34. As another example, the input conditioning module 72 may be an input selection module that is configured to select one or more input video streams 34 to produce an (active) input video stream 34 (e.g., the input selection module includes a video switch and/or a video mixer). Where used with respect to the video adjustment modules 64 and if the input conditioning module 72 is present, the input video stream 34 refers to the (conditioned) input video stream 34.

The video adjustment modules 64 are cascaded such that the video adjustment modules 64 operate (if needed) in series on the input video stream 34 to produce the bandwidth-limited video stream 36. Thus, a module may be referred to as being upstream or downstream of other modules, with upstream modules closer to the video input port 42 and downstream modules closer to the video output port 44. Though the most upstream of the video adjustment modules 64 may operate on the input video stream 34, the input video stream 34 may be conditioned (e.g., adjusted, buffered, filtered, decompressed, selected, mixed, or otherwise operated on) by the input conditioning module 72 prior to transmission to the most upstream of the video adjustment modules 64 (no direct connection between the video input port 42 and the most upstream module is necessary). Though the most downstream of the video adjustment modules 64 may produce the bandwidth-limited video stream 36, the video stream output from the most downstream of the video adjustment modules 64 may be adjusted, buffered, filtered, or otherwise operated on prior to presentation at the video output port 44 (no direct connection between the video output port 44 and the most downstream of the video adjustment modules 64 is necessary).

The video scaling module 66 is configured to apply an image scale factor to a video stream input to the module (which may be referred to as a scaling operand video stream and a scaling input video stream) to produce a scaled video stream at the output of the module. The scaled video stream has an image resolution that is scaled by an image scale factor. That is, the image resolution of the scaled input video stream is the image scale factor times the image resolution of the scaling operand video stream. The video scaling module 66 is generally configured to reduce the image resolution of the video stream as it is passed through the module. Hence, the image scale factor is typically a value less than one. Algorithms to reduce the image resolution include downsampling (eliminating pixels, typically periodically) and decimation (applying an antialiasing filter and/or a low pass filter and then downsampling). For speed of processing, image scale factors may be limited to (and/or applied as) inverse integers or integer fractions. If the scaling operand video stream is compressed, the video scaling module 66 may decompress the video stream prior to applying the image scale factor. The video scaling module 66 generally does not re-compress a video stream that has been decompressed to apply the image scale factor.

Image resolution is a measure of the number of pixels in an individual video frame. The image resolution may be expressed as the height and width (i.e., image height and image width) of the video frames. Additionally or alternatively, image resolution may be expressed as the number of pixels in each of the video frames, the number of pixels being the height times the width. As used herein, a factor times an image resolution is the factor times the width and the factor times the height. Thus, the corresponding number of pixels is the factor squared times the original number of pixels.

As used herein, when comparing image resolutions, the comparisons are the conjunction (i.e., logical 'and' function) of the comparisons of the corresponding heights and widths. Thus, a first image resolution is less than a second image resolution if the height of the first image resolution is less than the height of the second image resolution and the width of the first image resolution is less than the width of the second image resolution. Unless noted otherwise, the systems and methods of the present disclosure include (in addition or in alternate) the comparison of image resolutions by other comparisons of the corresponding numbers of pixels and/or comparisons of the corresponding heights and/or widths (i.e., individually, non-exclusively disjunctively (i.e., logical 'or' function), or exclusively disjunctively (i.e., logical 'xor' function)). For example, the expression 'the first image resolution is less than the second image resolution' may be substituted with 'a number of pixels of the first image resolution is less than a number of pixels of the second image resolution.' As other examples, the same expression may be expressed as the height and/or the width of the first image resolution is less than the respective height and/or width of the second image resolution, e.g., 'a height of the first image resolution is less than a height of the second image resolution' or 'a height of the first image resolution is less than a height of the second image resolution or (i.e., logical Corp function) a width of the first image resolution is less than a width of the second image resolution.'

The video frame rate transformation module 68 is configured to apply a frame rate transformation factor to a video stream input to the module (which may be referred to as a frame-transformation operand video stream and a frame-transformation input video stream) to produce a frame-reduced video stream at the output of the module. The frame-reduced video stream has a transformed frame rate that is the frame rate transformation factor times the frame rate of the frame-transformation operand video stream. The frame rate transformation factor is a value less than or equal to one. Algorithms to reduce the frame rate include downsampling (eliminating frames, typically periodically) and decimation (applying an error-correcting filter and/or a low-pass filter and then downsampling). For speed of processing, frame rate transformation factors may be limited to (and/or applied as) inverse integers or integer fractions. For speed of processing, transformed frame rates due to frame rate transformation factors may be limited to (and/or applied as) integers or integer fractions. If the frame-transformation operand video stream is compressed, the video frame rate transformation module 68 may decompress the video stream prior to applying the frame rate transformation factor. The video frame rate transformation module 68 generally does not re-compress a video stream that has been decompressed to apply the frame rate transformation factor.

The video compression module 70 is configured to apply a compression factor conversion to a video stream input to the module (which may be referred to as a compression operand video stream and a compression input video stream) to produce a compressed video stream at the output of the module. The compressed video stream has a compression factor that is the compression factor conversion times the compression factor of the compression operand video stream. As illustrated in the example of FIG. 2, the video stream input to the video compression module 70 may be the output of another (upstream) video adjustment module 64. If the upstream video adjustment module 64 has adjusted the video stream, the video stream may be uncompressed (a compression factor of unity). Thus, the compression factor of the compressed video stream would be equal to the compression factor conversion.

As used herein, a compression factor is the ratio of the size of the input bitstream to the size of the output bitstream. When no compression is present or achieved, the input bitstream is the same size as the output bitstream and the compression factor is unity (1). When compression is present or achieved, the size of the output bitstream is less than the size of the input bitstream and the compression factor is greater than unity, with larger values indicating more compression. For video bitstreams, common compression algorithms may achieve compression factors of at least 2, 5, 10, 20, or 50. A related parameter is the compression ratio. The compression ratio is the inverse of the compression factor and is the ratio of the size of the output bitstream to the size of the input bitstream. Systems and methods of the present disclosure may use the compression ratio in place of the compression factor by accounting for the mathematical inverse of the replacement.

Compression algorithms to compress a video stream include (but are not limited to) H.265/HEVC (ITU-T and ISO/IEC), H.264/AVC (ITU-T and ISO/IEC), H.263 (ITU-T), H.261 (ITU-T), M-JPEG (ISO/IEC), MPEG-4 (ISO/IEC), MPEG-2 (ISO/IEC), MPEG-1 (ISO/IEC), VP9 (Google), and VP8 (Google). Compression algorithms to compress and decompress a video stream may be referred to as video codecs. One of skill in the art recognizes how to apply a compression algorithm to achieve a given compression factor (for example by specifying the target output bit rate).

Compression algorithms may be variable bit rate algorithms or constant bit rate algorithms. A variable bit rate algorithm generates an output bitstream with a size that depends on the content of the input bitstream. Generally a more complicated video image or segment would result in a larger compressed bitstream than a less complicated video image or segment. A constant bit rate algorithm generates an output bitstream with a substantially constant bit rate. The bit rate does not substantially vary according to the complexity of the input. However, constant bit rate algorithms do not necessarily produce a precisely constant bit rate. The bit rate from frame to frame may vary but the variance may be limited due to the constant bit rate algorithm. Some constant bit rate algorithms may have a frame to frame bit rate variance of less than 50%, 20%, 10%, or 5%. Some constant bit rate algorithms may limit the maximum bit rate to less than 50%, 20%, 10%, or 5% more than the nominal (or average) bit rate.

With regard to planning for bandwidth requirements, the bit rate of both a variable bit rate algorithm and a constant bit rate algorithm may be estimated as the maximum expected bit rate of the algorithm. The difference between the estimated bit rate and the actual bit rate is bandwidth that is not utilized (by the compressed video; the bandwidth generally is still consumed by the media flow). Therefore, the efficiency of allocating bandwidth may be facilitated by using a constant bit rate algorithm and, in particular, a constant bit rate algorithm with a low bit rate variance (e.g., less than 10%).

The configuration module 60 of the video input device 22 may be configured to receive a selection of target video parameters corresponding to a bandwidth limit. The configuration module 60 may be configured to determine the bandwidth limit based upon the target video parameters and/or may be configured to receive the bandwidth limit as part of or the entirety of the selection of target video parameters. Generally, the target video parameters are video parameters that correspond to video quality. For example, the target video parameters may include an image resolution limit (e.g., a height limit, a width limit, and/or a pixel number limit), a frame rate limit, and/or a compression factor limit. The target video parameters may include other parameters additionally or alternatively, such as color depth, bits per pixel, and/or color encoding. Further, the configuration module 60 may be configured to estimate and/or determine any or all of the target video parameters based upon a user selection of the video type and/or source. The configuration module 60 may include a user interface to interact with the user 12.

The image resolution limit is the maximum permitted value and is a value specified, transmitted, or otherwise provided by the user 12. The image resolution limit is also essentially the minimum acceptable image resolution for quality purposes. However, as disclosed herein, if the input video stream 34 has an image resolution (its native image resolution) that is less than the image resolution limit, the systems and methods of the present disclosure will transmit the adjusted video stream with the native image resolution of the input video stream 34 (less than the image resolution limit). That is, low resolution input video generally will not be scaled to higher resolution at the output of video input device 22.

Similarly, if the input video stream 34 has an image resolution that is greater than the image resolution limit but the bandwidth consumed by the input video stream 34 (as adjusted by any prior video parameter adjustments, e.g., frame rate adjustment) is less than the bandwidth limit, the systems and methods of the present disclosure generally will transmit the adjusted video stream with the native image resolution of the input video stream 34 (greater than the image resolution limit). That is, high resolution input video may be only scaled to lower resolution if the bandwidth limit is exceeded at the input of the video input device 22 (e.g., at the video input port 42) and/or the input of the video scaling module 66. In some embodiments, it may be desirable to maintain the image resolution of the bandwidth-limited video stream 36 at the video output port 44 (e.g., to avoid excess mode changes in rendering devices downstream of the video input device 22, e.g., the video output device 26 and/or the video destination 28). In such a case, the video scaling module 66 may scale the scaling operand video stream even if not necessary to meet the bandwidth limit. Additionally or alternatively, the bandwidth-limited video stream 36, after exit from the video output port 44 and after transport across the bandwidth-limited link 24, may be scaled to the desired resolution.

The frame rate limit is the minimum permitted value and is a value specified, transmitted, or otherwise provided by the user 12. The frame rate limit is also essentially the minimum acceptable frame rate for quality purposes. However, as disclosed herein, if the input video stream 34 has a frame rate (its native frame rate) that is less than the frame rate limit, the systems and methods of the present disclosure will transmit the adjusted video stream with the native frame rate of the input video stream 34 (less than the frame rate limit). That is, low frame rate input video generally will not be transformed to higher frame rate at the output of the video input device 22.

Similarly, if the input video stream 34 has a frame rate that is greater than the frame rate limit but the bandwidth consumed by the input video stream 34 (as adjusted by any prior video parameter adjustments, e.g., image scaling) is less than the bandwidth limit, the systems and methods of the present disclosure generally will transmit the adjusted video stream with the native frame rate of the input video stream 34 (greater than the frame rate limit). That is, high frame rate input video may only be transformed to lower frame rate if the bandwidth limit is exceeded at the input of the video input device 22 (e.g., at the video input port 42), and where it is transformed, the lower frame rate will not be lower than the frame rate limit. In some embodiments, it may be desirable to maintain the frame rate of the bandwidth-limited video stream 36 at the video output port 44 (e.g., to avoid excess mode changes in rendering devices downstream of the video input device 22, e.g., the video output device 26 and/or the video destination 28). In such a case, the video frame rate transformation module 68 may transform the frame rate of the frame-transformation operand video stream even if not necessary to meet the bandwidth limit. Additionally or alternatively, the bandwidth-limited video stream 36, after exit from the video output port 44 and transport across the bandwidth-limited link 24, may be frame rate transformed to the desired frame rate.

The compression factor limit is the maximum permitted value and is a value specified, transmitted, or otherwise provided by the user 12. The compression factor is also essentially the maximum acceptable compression for quality purposes. Generally, the input video stream 34 is uncompressed or is subject to decompression upstream of the video input device 22 and/or the first of the video adjustment modules 64. In the example of FIG. 2, the input conditioning module 72 of the video input device 22 may include and/or may be an input decompression module that is configured to decompress the input video stream 34 if it is compressed. The output of the input conditioning module 72 in this example would be the (uncompressed) input video stream 34. The (uncompressed) input video stream 34 is the operand input for the video adjustment modules 64 of the video input device 22 (the first video adjustment module 64 being the video scaling module 66).

Relative to evaluating the bandwidth limit and other video adjustment parameters (e.g., the image resolution, the frame rate, etc.), the bandwidth consumed by the (uncompressed) input video stream 34 is the relevant bandwidth of the input video stream 34. One exception is that, if the input video stream 34 is compressed (at greater than, equal to, or less than the compression factor limit) and the input video stream 34 at the video input port 42 has a bandwidth that is less than or equal to the bandwidth limit (thus, no video parameter adjustments would be needed) then the input video stream 34 may be transmitted in original form from the video input device 22 as the bandwidth-limited video stream 36. If the input video stream 34 at the video input port 42 (whether initially compressed or not) exceeds the bandwidth limit, the input video stream 34 generally is decompressed if necessary (before or after arriving at the video input port 42) and the (uncompressed) input video stream 34 is operated on by the video adjustment modules 64 (optionally including the video compression module 70) to achieve the bandwidth limit in the bandwidth-limited video stream 36.

Where a bandwidth of a video stream (or the bandwidth limit) is calculated or estimated, the bandwidth is the product of the number of pixels corresponding to the image resolution, the frame rate, the number of bits per pixel corresponding to the color depth and the color encoding format, and the compression ratio (the inverse compression factor). The calculated or estimated bandwidth may further include factors or addends which account for overhead (e.g., transmission protocol overhead, encryption overhead, etc.), headroom (e.g., reservation of unfilled bandwidth), and/or co-transmitted data (e.g., corresponding audio and/or metadata). Where one or more values needed to compute the bandwidth is not available, an estimate may be used. The estimate may be a worst case estimate (leading to calculating and/or estimating the largest bandwidth with respect to this parameter), a value based upon expectations (e.g., a particular image resolution and frame rate may be commonly associated with a particular number of bits per pixel), or a value based upon prior use. For example, continuous tone images (real scenes and high quality renderings) commonly are transmitted in a 4:2:0 ($Y':C_b:C_r$) sampling at 8 bits per component, resulting in an average of 12 bits per pixel, or a 4:2:2 ($Y':C_b:C_r$) sampling at 10 bits per component, resulting in an average of 20 bits per pixel.

The bandwidth limiting module 62 of the video input device 22 is configured to control the operation of the video adjustment modules 64 and the routing of the video stream through the video input device 22. The bandwidth limiting module 62 is configured to determine if the input bandwidth of the input video stream to the video input device 22 is greater than the bandwidth limit (e.g., as defined by the user 12). If the input bandwidth is less than or equal to the bandwidth limit, the bandwidth limiting module 62 may be configured to transmit the input video stream from the video input port 42 to the video output port 44 unaffected (no video parameter changes). Additionally or alternatively, the bandwidth limiting module 62 may direct the video adjustment modules 64 to transmit the video stream across each module without any video parameter changes if the input bandwidth is less than or equal to the bandwidth limit. If the input bandwidth is greater than the bandwidth limit, the bandwidth limiting module 62 directs the video adjustment modules 64 to selectively adjust the video parameters of the video stream to achieve the bandwidth limit.

The bandwidth limiting module 62 may determine the video parameters of the input video stream 34 (or the (conditioned) input video stream 34) and transmit the determined video parameters (and/or a proxy such as input quality or a subset) from the video input device 22 to the video output device 26. For example, the determined video parameters may be embedded in the bandwidth-limited video stream 36 as metadata. As another example, the determined video parameters may be communicated to the video output device 26 through an alternate communications channel. Transmission of the video parameters (and/or a proxy such as the video quality or a subset of parameters) may facilitate the restoration of the input video stream 34 at the video output device 26.

The bandwidth limiting module 62 may be configured to control the operation of the input conditioning module 72 (e.g., to select the (active) input video stream 34, to decompress the input video stream 34 to produce the (uncompressed) input video stream 34). If the input bandwidth of the input video stream 34 is less than or equal to the bandwidth limit, the bandwidth limiting module 62 may direct the input conditioning module 72 to pass the input video stream 34 unaffected.

Figure 3:
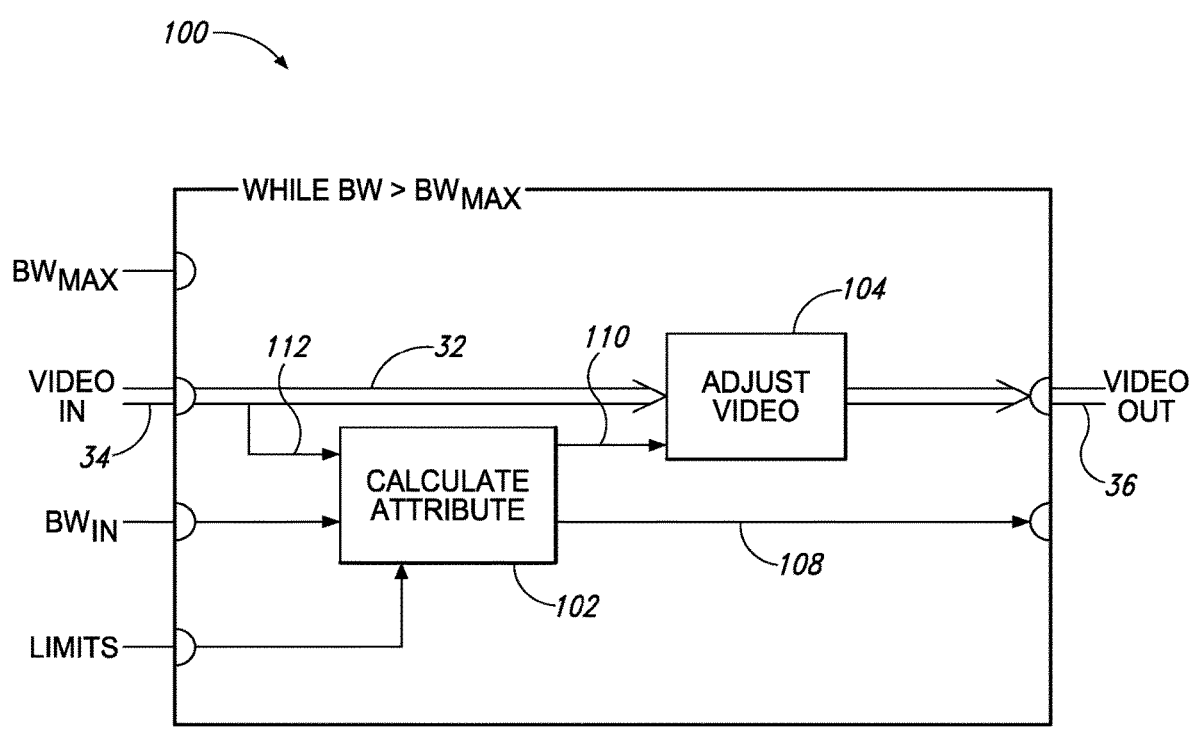
FIG. 3 is a schematic representation of video transport methods according to the present disclosure.

The operation of the bandwidth limiting module 62 in conjunction with the video adjustment modules 64 generally follows the methods 100 illustrated in FIG. 3. The general operation of the bandwidth limiting module 62 may be expressed as a while loop: while the bandwidth 108 (BW) of the video stream 32 is greater than the bandwidth limit ($BW_{max}$), calculate 102 one or more video attributes 110 that, when applied to the video stream (via a step of adjusting video 104), will cause the video stream to achieve the bandwidth limit or will reduce (at least not increase) the bandwidth of the video stream while conforming to the video parameter limits (e.g., the image resolution limit, the frame rate limit, and/or the compression factor limit). In FIG. 3, inputs to the while loop are illustrated on the left and outputs are illustrated on the right. Objects that are modified within the loop (i.e., the video stream 32 and the bandwidth 108) have horizontally aligned inputs and outputs. Though the example of FIG. 3 illustrates the calculation 102 and the adjustment 104 occurring within the same loop, methods 100 may include performing the calculation 102 to identify which video parameters 112 to adjust and the amount of adjustment (by calculating 102 the corresponding attributes 110) for all video parameters 112 and then adjusting 104 the video stream according to the video parameters 112 and attributes 110 calculated by the calculating 102.

Calculating 102 includes receiving as inputs the limits associated with one or more video parameters, the current value of the corresponding video parameters 112, and the current value of the bandwidth 108 (BW). Calculating 102 includes determining whether the current values of the video parameters 112 conform to the associated video parameter limits. If the current values do not conform to the limits, calculating 102 includes determining an attribute 110 that reduces the bandwidth 108. If the current values conform to the limits, calculating 102 directs the while loop to pass to the next iteration or otherwise directs and/or indicates no change to the subject video parameter values (and the video stream 32 with respect to the subject video parameters).

Generally, each pass through the while loop addresses a different video parameter or combination of video parameters. For example, the first pass may analyze the image resolution, the second pass may analyze the frame rate, and the third pass may analyze the compression factor.

As a specific example to illustrate the methods 100, the following discussion details methods 100 in which the image resolution is analyzed, then the frame rate, and then the compression factor. These methods may include receiving an input video stream ($Video_{in}$), the bandwidth consumed by the input video stream ($BW_{in}$), the bandwidth limit sourced from the user ($BW_{max}$), and the video parameter limits sourced from the user (Limits). For this example, the video parameter limits include an image resolution limit, a frame rate limit, and a compression factor limit. For the sake of the example, the input video stream has a bandwidth that is greater than the bandwidth limit and at least one of input video parameters does not conform to the corresponding limit. Specifically, the input image resolution is greater than the image resolution limit, the input frame rate is greater than the frame rate limit, and/or the input compression factor is less than the compression factor limit. Not all input video streams to the video transport system need to exceed the bandwidth limit. The systems and methods of the present disclosure adapt to transmit an input video stream that complies with the bandwidth limit without modification of the video stream.

The while loop is entered because the bandwidth of the input video stream is greater than the bandwidth limit. In the first pass of the while loop (also referred to as a first stage of the method), the calculating 102 compares the input image resolution of the input video stream to the image resolution limit. If the input image resolution is less than or equal to the image resolution limit, calculating 102 may provide a first-stage image resolution that is equal to the input image resolution or may otherwise cause the while loop to iterate and/or indicate that the image resolution of the video stream 32 need not be adjusted. For example, calculating 102 may include determining the first-stage image resolution and providing the first-stage image resolution as its output (the attribute 110). The determined first-stage image resolution is less than or equal to the image resolution limit and is equal to either the input image resolution (because the input image resolution is less than or equal to the image resolution limit) or, if the input image resolution is greater than the image resolution limit, a scaled image resolution.

The scaled image resolution is an image scale factor (a value less than one) times the input image resolution. The image scale factor may be calculated using the input width, input height, and/or input pixel number corresponding to the input image resolution and the respective width limit, height limit, and/or pixel number limit corresponding to the image resolution limit. For example, the image scale factor may be the minimum value of the ratio of the width limit to the input width, and the ratio of the image height limit to the input image height. As another example, the image scale factor may be the square root of the ratio of the pixel number limit to the input pixel number. The image scale factor may be further limited to one of several permitted values (e.g., an inverse integer) by selecting the largest permitted value that is less than or equal to the initially calculated scale factor. Hence, the image scale factor that results from the calculating 102 of the first pass (i.e., the output attribute 110 of the first pass) times the input image resolution results in an image resolution that is at most equal to the image resolution limit.

Once the first-stage image resolution is determined, the first-stage bandwidth of the video stream 32 that would result or does result from applying the first-stage image resolution may be calculated. The first-stage bandwidth is calculated based upon the first-stage image resolution and the input frame rate as described herein. The first-stage bandwidth generally is calculated based upon a compression factor of unity (no compression) so that compression may be applied only as needed in later stages. However, the first-stage bandwidth may be calculated based upon the input compression factor. The first-stage bandwidth may be calculated based upon the bits per pixel in the input video stream. The first-stage bandwidth is presented as the bandwidth 108 and becomes the input for the next pass of the while loop.

At the next pass of the while loop (the second stage of the method 100), the input bandwidth (the first-stage bandwidth) is compared with the bandwidth limit. Provided that the first-stage bandwidth is greater than the bandwidth limit, the calculating 102 compares the input frame rate of the input video stream (which is the same as the frame rate of the adjusted video stream 32 if adjusted in the first-stage) to the frame rate limit. If the input frame rate is less than or equal to the frame rate limit, calculating 102 may provide a second-stage frame rate that is equal to the input frame rate or may otherwise cause the while loop to iterate and/or indicate that the frame rate of the video stream 32 need not be adjusted. For example, calculating may include determining the second-stage frame rate and providing the second-stage frame rate as its output (the attribute 110). The determined second-stage frame rate is equal to either the input frame rate (because the input frame rate is less than or equal to the frame rate limit) or, if the input frame rate is greater than the frame rate limit, a transformed frame rate that is less than the input frame rate and greater than or equal to the frame rate limit.

The transformed frame rate is a frame rate transformation factor (a value less than one) times the input frame rate. The frame rate transformation factor may be calculated using the bandwidth limit and the first-stage bandwidth (which includes the first-stage image resolution). For example, a preliminary frame rate transformation factor may be the ratio of the bandwidth limit to the first-stage bandwidth. As another example, the preliminary frame rate transformation factor may be the ratio of the bandwidth limit to the product of the number of pixels corresponding to the first-stage image resolution, the input frame rate, and the bits-per-pixel in the input video stream. The minimum transformed frame rate is the frame rate limit. Hence, the frame rate transformation factor is the maximum of the preliminary frame rate transformation factor (e.g., as described above) and the ratio of the frame rate limit to the input frame rate. The transformed frame rate may be further limited to one of several permitted values (e.g., an integer number of frames per second) by selecting the largest permitted value that is less than or equal to the initially calculated transformed frame rate and greater than or equal to the frame rate limit. Hence, the second-stage frame rate that results from the calculating 102 of the second pass (i.e., the output attribute 110 of the second pass) is at least as great as the frame rate limit, unless the input frame rate is less than the frame rate limit.

Once the second-stage frame rate is determined, the second-stage bandwidth of the video stream 32 that would result or does result from applying the second-stage frame rate may be calculated. The second-stage bandwidth is calculated based upon the second-stage frame rate and the first-stage image resolution as described herein. The second-stage bandwidth generally is calculated based upon a compression factor of unity (no compression) so that compression may be applied only as needed in later stages. However, the second-stage bandwidth may be calculated based upon the input compression factor. The second-stage bandwidth may be calculated based upon the bits per pixel in the input video stream. The second-stage bandwidth is presented as the bandwidth 108 and becomes the input for the next pass of the while loop.

At the next pass of the while loop (the third stage of the method 100), the input bandwidth (the second-stage bandwidth) is compared with the bandwidth limit. Provided that the second-stage bandwidth is greater than the bandwidth limit, the calculating 102 compares the input compression factor (or unity if the video stream is uncompressed or has been decompressed during earlier steps) to the compression factor limit. If the input compression factor (or unity) is less than or equal to the compression factor limit (which generally it will be if the methods 100 do not include any further stages to adjust other video parameters), calculating 102 may provide a third-stage compression factor that is greater than or equal to the ratio of the second-stage bandwidth to the bandwidth limit, and that is less than or equal to the compression factor limit. Additionally or alternatively, calculating 102 may provide a third-stage compression factor conversion that is the ratio of the third-stage compression factor to the input compression factor (or unity). The compression factor may be further limited to one of several permitted values (e.g., obtainable compression factors of the algorithm selected for compression of the video stream) by selecting the largest permitted value that is less than or equal to the initially calculated compression ratio (and consequently less than or equal to the compression factor limit).

After passing through these three stages, the method 100 of this example results in video parameters (image resolution, frame rate, and compression factor) that, when applied to the input video stream, produce a bandwidth-limited video stream with a bandwidth approximately equal to or less than the bandwidth limit.

Methods 100 may include adjusting 104 the input video stream to produce the bandwidth-limited video stream (Video$_{out}$) by applying the video parameters calculated with the calculating 102. Adjusting 104 may include operating and/or using the video adjustment modules 64 of FIG. 2, such as the video scaling module 66, the video frame rate transformation module 68, and/or the video compression module 70.

In the terms of the prior example, adjusting 104 may include scaling according to the first-stage image resolution, transforming frame rate according to the second-stage frame rate (if the first-stage bandwidth is greater than the bandwidth limit), and compressing according to the third-stage compression factor (if the second-stage bandwidth is greater than the bandwidth limit). Adjusting 104 may include scaling the input video stream to the first-stage image resolution to form a scaled video stream with the first-stage image resolution. If no more adjustment is needed to satisfy the bandwidth limit, the scaled video stream may be transmitted as the bandwidth-limited video stream. Adjusting 104 may include transforming the scaled video stream to the second-stage frame rate to form a transformed video stream with the first-stage image resolution and the second-stage frame rate. If no more adjustment is needed to satisfy the bandwidth limit, the transformed video stream may be transmitted as the bandwidth-limited video stream. Adjusting 104 may include compressing the transformed video stream to the third-stage compression factor to form the bandwidth-limited video stream with the first-stage image resolution, the second-stage frame rate, and the third-stage compression factor.

Figure 4:
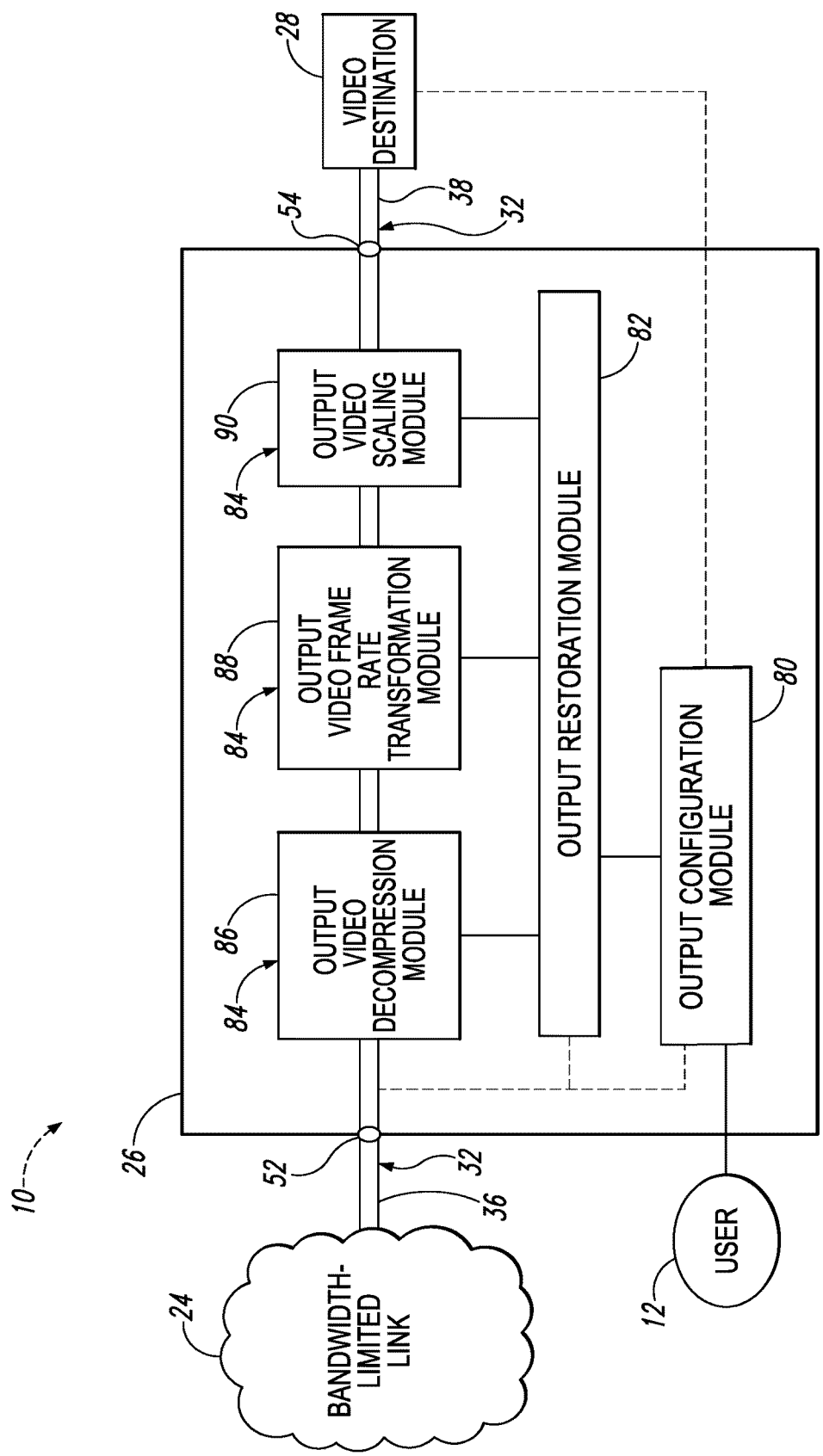
FIG. 4 is a schematic representation of a video output device in a video transport system according to the present disclosure.

FIG. 4 is a schematic representation of the video output device 26 of the video transport system 10. The video output device 26 includes a video input port 52 and a video output port 54, and may include a facility to accept input from the user 12. For example, the video output device 26 may include a user interface to interact with the user 12 and/or a communications channel to receive specified output video parameters. Additionally or alternatively, the video output device 26 may communicate with the video destination 28 to receive specified output video parameters (e.g., preferred, compatible, and/or mandatory video parameters for the operation of the video destination 28). In the video output device 26, the bandwidth-limited video streams 36 that arrive at the video input port 52 are transferred (as optionally processed) to the video output port 54. The video output device 26 may include one or more video input ports 52 and/or one or more video output ports 54. Video streams 32 may be directed between any video input port 52 and any video output port 54. Video streams 32 may be processed within the video output device 26, multiple video streams 32 may be merged, and/or a video stream 32 may be replicated. Each video input port 52 and each video output port 54 independently may be a physical channel (e.g., a wired or wireless connection) or may be a logical port within a communications channel that utilizes a physical channel. For example, all video input ports 52 may be logical ports in a single communications channel. As another example, some video output ports 54 may be logical ports in a single communications channel and different video output ports 54 may be connected to different communications channels.

The outgoing, active, or selected output video stream 38 (e.g., connected to the active or selected video destination 28) of the video output device 26 may change during operation of the video transport system 10. For example, two video destinations 28 with different video parameters may be connected such that each may receive a respective output video stream 38. Either of the output video streams 38 may be selected as desired (e.g., by video output device 26 or by a switch downstream of the video output device 26), resulting in varying preferred, compatible, and/or mandatory video parameters for a compatible output video stream 38. Generally, the video output device 26 is configured to present the output video stream 38 with a fixed set (or subset) of video parameters (e.g., the video parameters that are preferable, compatible, and/or mandatory for a particular one or more video destinations 28).

The video parameters of the output video stream 38 typically are determined based on the video destination 28 and/or the video parameters of the input video stream 34. The video parameters of the output video stream 38 may not be affected by the video parameters of the bandwidth-limited video 36. The video output device 26 generally applies video transformation to the bandwidth-limited video stream 36 to substantially reconstruct (or substantially restore) the input video stream 34 with video parameters that are compatible with the video destination 28. Substantially reconstruct or restore in the context of the output video stream 38 means to reproduce the video content of the input video stream 34 in a manner that is suitable for the video destination 28 (e.g., have video parameters that are preferred, compatible, and/or mandatory for the video destination 28). In some embodiments, the substantially reconstructed or restored input video stream 34 (i.e., the output video stream 38 produced by the video output device 26) may have the same video parameters as the input video stream 34. The output video stream 38 may have lower quality than the input video stream 34, in particular if the transformations of the video input device 22 are not lossless and/or visually lossless.

The video output device 26 includes several modules to automatically adjust the video parameters of the bandwidth-limited video stream 36 and to transmit the output video stream 38 from the video output port 54. Modules include an output configuration module 80, an output restoration module 82, and at least one output video adjustment module 84 to adjust the video parameters of the video stream.

As illustrated in the example of FIG. 4, the output video adjustment modules 84 may include modules dedicated to performing independent adjustment to the video content of the bandwidth-limited video stream 36, for example, an output video decompression module 86 to decompress the video stream, an output video frame rate transformation module 88 to transform the frame rate, and/or an output video scaling module 90 to scale the image resolution. Output video adjustment modules 84 may adjust one or more video parameters. Different output video adjustment modules 84 may each adjust different video parameters. Additionally or alternatively, two output video adjustment modules 84 may adjust the same video parameter (typically in different manners or in conjunction with different combinations of video parameters).

Generally, the output video adjustment modules 84 operate to transform the same video parameters that the video input device 22 may operate on. Further, the output video adjustment modules 84 are configured and operated to generally invert the transformations applied by the video input device 22. For example, the output video adjustment modules 84 in FIG. 4 are arranged to decompress, frame rate transform, and scale the video content (the same transformations applied by the video adjustment modules 64 of the video input device 22 of FIG. 2). Additionally, the output video adjustment modules 84 of FIG. 4 are arranged in the inverse order of the video adjustment modules 64 of FIG. 2. Thus, the video transport system 10 may be configured to transform the input video stream 34 into the bandwidth-limited video stream 36 by first scaling (if necessary), next frame rate transforming (if necessary), and then compressing (if necessary). The video transport system 10 may then transform the bandwidth-limited video stream 36 into the output video stream 38 by first decompressing (if necessary), next frame rate transforming (if necessary), and then scaling (if necessary). Like the video adjustment modules 64, each output video adjustment module 84 operates on a video stream input to that module, which may be referred to as a module operand video stream and a module input video stream.

The output video adjustment modules 84 are cascaded such that the output video adjustment modules 84 operate (if needed) in series on the bandwidth-limited video stream 36 to produce the output video stream 38. Thus, a module may be referred to as being upstream or downstream of other modules, with upstream modules closer to the video input port 52 and downstream modules closer to the video output port 54. Though the most upstream of the output video adjustment modules 84 may operate on the bandwidth-limited video stream 36, the bandwidth-limited video stream 36 may be adjusted, buffered, filtered, or otherwise operated on prior to transmission to the most upstream of the output video adjustment modules 84 (no direct connection between the video input port 52 and the most upstream module is necessary). Though the most downstream of the output video adjustment modules 84 may produce the output video stream 38, the video stream output from the most downstream of the output video adjustment modules 84 may be adjusted, buffered, filtered, compressed, or otherwise operated on prior to presentation at the video output port 54 (no direct connection between the video output port 54 and the most downstream of the output video adjustment modules 84 is necessary).

The output video decompression module 86 is configured to decompress the operand video stream input to the module to produce an uncompressed video stream at the output of the module. As illustrated in the example of FIG. 4, the video stream input to the video compression module 86 generally is the bandwidth-limited video stream 36. Algorithms to decompress the operand video stream include the decompression algorithms associated with the examples of compression algorithms. One of skill in the art recognizes how to select and apply a suitable decompression algorithm to decompress a given compressed video stream.

The output video frame rate transformation module 88 is configured to apply a frame rate transformation factor to the operand video stream input to the module to produce a frame-expanded video stream at the output of the module. The frame-expanded video stream has a transformed frame rate that is generally greater the frame rate of the operand video stream. The transformed frame rate may be the frame rate of the input video stream 34 and/or the preferred, compatible, and/or mandatory frame rate of the video destination 28. Algorithms to increase the frame rate include replicating frames and interpolating between frames. The output video frame rate transformation module 88 may be configured to produce a frame-reduced video stream at the output of the module.

The output video scaling module 90 is configured to apply an image scale factor to the operand video stream input to the module to produce a scaled video stream at the output of the module. The output video scaling module 90 is generally configured to increase the image resolution of the video stream as it is passed through the module. Hence, the image scale factor is typically a value greater than one. Algorithms to increase the image resolution include replication, interpolation (e.g., bilinear, bicubic, etc.), resampling (e.g., Lanczos resampling).

The output configuration module 80 of the video output device 26 may be configured to receive a selection of target output video parameters that are preferred, compatible, and/or mandatory (or otherwise suitable) for the output video stream 38 and/or the video destination 28. The output configuration module 80 may be configured to determine the target output video parameters based upon the video parameters, quality, and/or content type of the input video stream 34 (as communicated by the video input device 22, e.g., in the bandwidth-limited video stream 36 and/or via an alternate communications channel, and/or by the user 12). Additionally or alternatively, the output configuration module 80 may be configured to determine the target video parameters based upon communication with the video destination 28. The output configuration module 80 may include a user interface to interact with the user 12.

The output restoration module 82 of the video output device 26 is configured to control the operation of the output video adjustment modules 84 and the routing of the video stream through the video output device 26. The output restoration module 82 is configured to determine if the bandwidth-limited video stream 36 needs to be adjusted to meet the target output video parameters of the output video stream 38. The output restoration module 82 may be configured to apply the output video adjustment modules 84 in the order and with suitable transformation parameters to substantially reconstruct the input video stream 34 from the bandwidth-limited video stream 36. If the transformations of the video input device 22 are lossless or visually lossless, the reconstruction may produce the same video content as the input video stream 34 or may produce video content that is visually indistinguishable from the video content of the input video stream 34.

Figure 5:
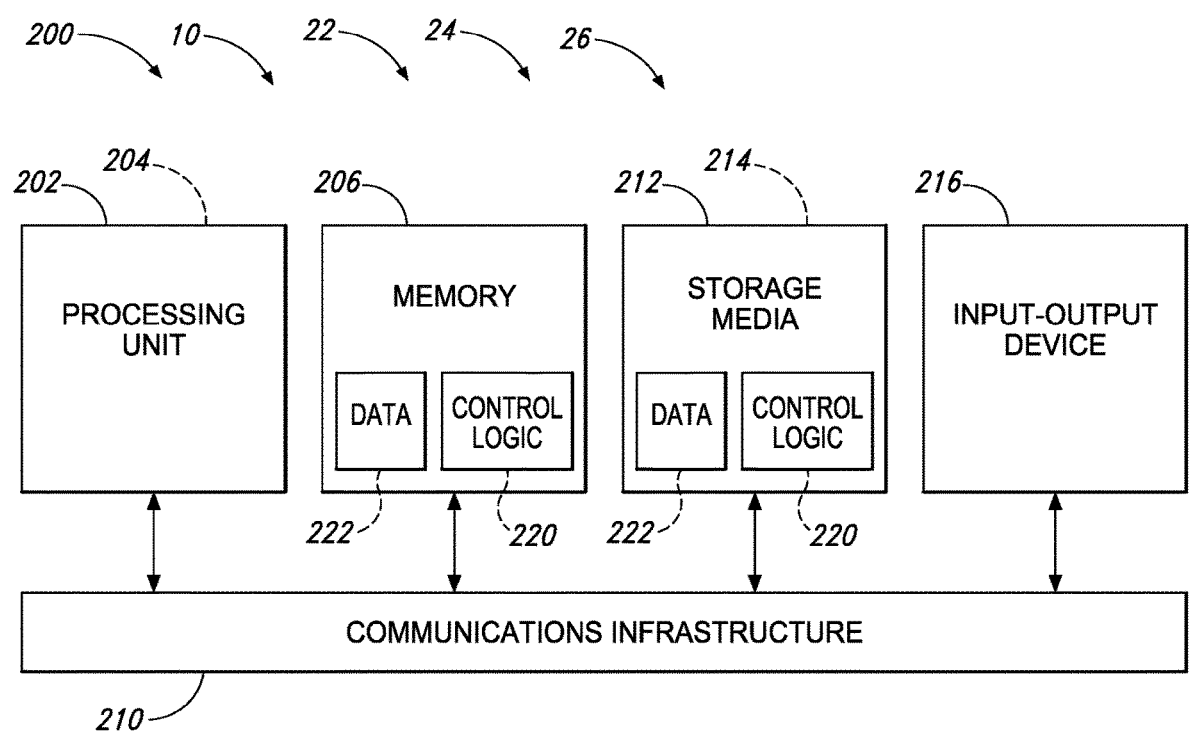
FIG. 5 is a schematic representation of computerized systems according to the present disclosure.

FIG. 5 schematically represents a computerized system 200 that may be used to implement and/or instantiate video transport system 10 and components thereof, such as video source 20, video input device 22, video output device 26, video destination 28, configuration module 60, bandwidth limiting module 62, video adjustment modules 64, video scaling module 66, video frame rate transformation module 68, video compression module 70, input conditioning module 72, output configuration module 80, output restoration module 82, output video adjustment modules 84, output video decompression module 86, output video frame rate transformation module 88, and output video scaling module 90. The computerized system 200 includes a processing unit 202 that may be operatively coupled to a computer-readable memory 206 by a communications infrastructure 210. The processing unit 202 may include one or more computer processors 204 and may include a distributed group of computer processors 204. The processing unit 202 may include, or be implemented on, programmable, reconfigurable, and/or dedicated hardware such as field-programmable gate arrays, digital signal processors, and/or application specific integrated circuits.

The computerized system 200 also may include a computer-readable storage media assemblage 212 that is operatively coupled to the processing unit 202 and/or the computer-readable memory 206, e.g., by communications infrastructure 210. The computer-readable storage media assemblage 212 may include one or more non-transitory computer-readable storage media 214 and may include a distributed group of non-transitory computer-readable storage media 214.

The communications infrastructure 210 may include a local data bus, a communication interface, and/or a network interface. The communications infrastructure 210 may be configured to transmit and/or to receive signals, such as electrical, electromagnetic, optical, and/or acoustic signals. The communication infrastructure 210 may include the video input port 42 and/or the video output port 44. Additionally or alternatively, the video input port 42 and/or the video output port 44 may be logical ports within a communications protocol (e.g., a network communications protocol).

The computerized system 200 may include one or more input-output devices 216 operatively coupled to the processing unit 202, the computer-readable memory 206, and/or the computer-readable storage media assemblage 212. Input-output devices 216 are generally configured for user interaction and may be configured for visual, audio, and/or tactile input and/or output. Each input-output device 216 independently may be configured for only input, only output, primarily input, primarily output, and/or a combination of input and output. Examples of input-output devices 216 include monitors (e.g., video monitor), displays (e.g., alphanumeric displays, lamps, and/or LEDs), keyboards, pointing devices (e.g., mice), touch screens, speakers, and buzzers.

The computerized system 200 may include a distributed group of computers, servers, workstations, etc., which each may be interconnected directly or indirectly (including by network connection). Thus, the computerized system 200 may include one or more processing units 202, computer-readable memories 206, computer-readable storage media assemblages 212, and/or input-output devices 216 that are located remotely from one another.

One or both of the computer-readable memory 206 and the computer-readable storage media assemblage 212 include control logic 220 and/or data 222. Control logic 220 (which may also be referred to as software, firmware, gateware, and/or hardware) may include instructions that, when executed by the processing unit 202, cause the computerized system 200 to perform one or more of the methods described herein. Control logic 220 may include one or more of the configuration module 60, bandwidth limiting module 62, video adjustment modules 64, video scaling module 66, video frame rate transformation module 68, video compression module 70, input conditioning module 72, output configuration module 80, output restoration module 82, output video adjustment modules 84, output video decompression module 86, output video frame rate transformation module 88, and output video scaling module 90. Data 222 may include the video parameter limits, input video parameters, bandwidth-limited video parameters, and/or data associated with the modules and/or methods described herein.

Where devices, modules, and/or methods are described as performing one or more functions, the respective device and/or module is configured, e.g., programmed, to perform the function(s). The respective device and/or module may include one or more programs, agents, services, and/or components configured, e.g., programmed, to perform the function(s) when the programs, agents, services, and/or components are executed by the processing unit 202 or otherwise operated by the computerized system 200. The control logic 220 and/or data 222 may include instructions and/or information corresponding to the programs, agents, services, and/or components.

Examples of inventive subject matter according to the present disclosure are described in the following enumerated paragraphs.

A1. A method for enforcing a bandwidth limit in a bandwidth-limited video transport system, the method comprising:

receiving from a user a selection of an image resolution limit, a frame rate limit, and a compression factor limit;

receiving a bandwidth limit or alternatively calculating a bandwidth limit based upon the image resolution limit, the frame rate limit, and the compression factor limit;

receiving an input video stream that has an input image resolution, an input frame rate, and an input compression factor, and wherein at least one of the input image resolution is greater than the image resolution limit, the input frame rate is greater than the frame rate limit, and the input compression factor is less than the compression factor limit;

determining a first-stage image resolution that is less than or equal to the image resolution limit, wherein the first-stage image resolution is equal to either the input image resolution or, if the input image resolution is greater than the image resolution limit, a scaled image resolution that is an image scale factor times the input image resolution;

calculating a first-stage bandwidth based upon the first-stage image resolution and the input frame rate, and optionally the input compression factor;

provided that the first-stage bandwidth is greater than the bandwidth limit:

determining a second-stage frame rate that is equal to either the input frame rate or, if the input frame rate is greater than the frame rate limit, a transformed frame rate that is a frame rate transformation factor times the input frame rate and that is greater than or equal to the frame rate limit;

calculating a second-stage bandwidth based upon the first-stage image resolution and the second-stage frame rate, and optionally the input compression factor; and provided that the second-stage bandwidth is greater than the bandwidth limit, determining a third-stage compression factor that is greater than or equal to a ratio of the second-stage bandwidth to the bandwidth limit, and is less than or equal to the compression factor limit; and adjusting the input video stream to produce a bandwidth-limited video stream by scaling according to the first-stage image resolution, transforming frame rate according to the second-stage frame rate, provided that the first-stage bandwidth is greater than the bandwidth limit, and compressing according to the third-stage compression factor, provided that the second-stage bandwidth is greater than the bandwidth limit.

A1.1. The method of paragraph A1, wherein the receiving the input video stream and adjusting the input video stream are performed with a video input device of the bandwidth-limited video transport system.

A2. The method of any of paragraphs A1-A1.1, wherein the input video stream is an uncompressed video stream with the input compression factor being unity.

A3. The method of any of paragraphs A1-A2, wherein receiving the input video stream includes receiving a compressed video stream with a compression factor greater than unity and decompressing the compressed video stream to form the input video stream with the input compression factor being unity.

A4. The method of any of paragraphs A1-A3, further comprising determining that an input bandwidth of the input video stream is greater than the bandwidth limit.

A5. The method of any of paragraphs A1-A4, wherein the first-stage bandwidth is greater than the bandwidth limit and optionally wherein the second-stage bandwidth is greater than the bandwidth limit.

A6. The method of any of paragraphs A1-A5, wherein the image resolution limit includes an image width limit and an image height limit, wherein the input image resolution includes an input image width and an input image height, and wherein determining the first-stage image resolution includes determining the image scale factor by calculating a minimum value of a ratio of the image width limit to the input image width and a ratio of the image height limit to the input image height.

A7. The method of any of paragraphs A1-A6, wherein the image resolution limit includes a pixel number limit and the input image resolution includes an input pixel number, and wherein the determining the first-stage image resolution includes determining the image scale factor by calculating a square root of a ratio of the pixel number limit to the input pixel number.

A8. The method of any of paragraphs A1-A7, wherein the determining the second-stage frame rate includes determining the frame rate transformation factor by calculating a ratio of the bandwidth limit to the first-stage bandwidth.

A9. The method of any of paragraphs A1-A8, wherein the input video stream has an input bits-per-pixel, wherein the first-stage image resolution includes a first-stage pixel number, wherein the determining the second-stage frame rate includes determining the frame rate transformation factor by calculating a ratio of the bandwidth limit to a product of the first-stage pixel number, the input frame rate, and the input bits-per-pixel.

A10. The method of any of paragraphs A1-A9, wherein the adjusting the input video stream includes scaling the input video stream to the first-stage image resolution to form a scaled video stream with the first-stage image resolution, and optionally wherein the scaled video stream is the bandwidth-limited video stream.

A10.1. The method of paragraph A10, wherein the adjusting the input video stream includes transforming the scaled video stream to the second-stage frame rate to form a transformed video stream with the first-stage image resolution and the second-stage frame rate, and optionally wherein the transformed video stream is the bandwidth-limited video stream.

A10.1.1. The method of paragraph A10.1, wherein the adjusting the input video stream includes compressing the transformed video stream to the third-stage compression factor to form the bandwidth-limited video stream with the first-stage image resolution, the second-stage frame rate, and the third-stage compression factor.

A11. The use of a video input device of a bandwidth-limited video transport system to perform the method of any of paragraphs A1-A10.1.1.

A12. A bandwidth-limited video transport system comprising:
a computer-readable memory;
a processing unit operatively coupled to the computer-readable memory; and
a computer-readable storage media assemblage, wherein the computer-readable storage media assemblage is operatively coupled to the computer-readable memory and includes instructions that, when executed by the processing unit, cause the system to perform the method of any of paragraphs A1-A10.1.1.

B1. A method for enforcing a bandwidth limit in a bandwidth-limited video transport system, the method comprising:
  receiving from a user a selection of an image resolution limit, a frame rate limit, and a compression factor limit;
  receiving a bandwidth limit or alternatively calculating a bandwidth limit based upon the image resolution limit, the frame rate limit, and the compression factor limit;
  receiving an input video stream that has an input image resolution, an input frame rate, and an input compression factor, and wherein at least one of the input image resolution is greater than the image resolution limit, the input frame rate is greater than the frame rate limit, and the input compression factor is less than the compression factor limit; and
  reducing a bandwidth of the input video stream to produce a bandwidth-limited video stream by at least one of:
    determining that the input video stream has an input bandwidth that is greater than the bandwidth limit and that the input image resolution is greater than the image resolution limit, determining a first-stage image resolution that is less than or equal to the image resolution limit and that is an image scale factor times the input image resolution, calculating a first-stage bandwidth based upon the first-stage image resolution and the input frame rate, and optionally the input compression factor, and scaling the input video stream according to the first-stage image resolution to produce a scaled video stream;
    determining that the first-stage bandwidth is greater than the bandwidth limit and that the input frame rate is greater than the frame rate limit, determining a second-stage frame rate that is less than or equal to the frame rate limit and that is a frame rate transformation factor times the input frame rate, calculating a second-stage bandwidth based upon the first-stage image resolution and the second-stage frame rate, and optionally the input compression factor, and transforming the scaled video stream to the second-stage frame rate to produce a scaled, transformed video stream;
    determining that the second-stage bandwidth is greater than the bandwidth limit, determining a third-stage compression factor that is greater than or equal to a ratio of the second-stage bandwidth to the bandwidth limit and that is less than or equal to the compression factor limit, and compressing the scaled, transformed video stream according to the third-stage compression factor to produce the bandwidth-limited video stream that has a bandwidth less than the bandwidth limit.

B1.1. The method of paragraph B1, wherein receiving the input video stream and reducing the bandwidth of the input video stream are performed with a video input device of the bandwidth-limited video transport system.

B2. The method of any of paragraphs B1-B1.1, wherein the input video stream is an uncompressed video stream with the input compression factor being unity.

B3. The method of any of paragraphs B1-B2, wherein receiving the input video stream includes receiving a compressed video stream with a compression factor greater than unity and decompressing the compressed video stream to form the input video stream with the input compression factor being unity.

B4. The method of any of paragraphs B1-B3, wherein the image resolution limit includes an image width limit and an image height limit, wherein the input image resolution includes an input image width and an input image height, and wherein determining the first-stage image resolution includes determining the image scale factor by calculating a minimum value of a ratio of the image width limit to the input image width and a ratio of the image height limit to the input image height.

B5. The method of any of paragraphs B1-B4, wherein the image resolution limit includes a pixel number limit and the input image resolution includes an input pixel number, and wherein the determining the first-stage image resolution includes determining the image scale factor by calculating a square root of a ratio of the pixel number limit to the input pixel number.

B6. The method of any of paragraphs B1-B5, wherein the determining the second-stage frame rate includes determining the frame rate transformation factor by calculating a ratio of the bandwidth limit to the first-stage bandwidth.

B7. The method of any of paragraphs B1-B6, wherein the input video stream has an input bits-per-pixel, wherein the first-stage image resolution includes a first-stage pixel number, wherein the determining the second-stage frame rate includes determining the frame rate transformation factor by calculating a ratio of the bandwidth limit to a product of the first-stage pixel number, the input frame rate, and the input bits-per-pixel.

B8. The use of a video input device of a bandwidth-limited video transport system to perform the method of any of paragraphs B1-B7.

B9. A bandwidth-limited video transport system comprising:
  a computer-readable memory;
  a processing unit operatively coupled to the computer-readable memory; and
  a computer-readable storage media assemblage, wherein the computer-readable storage media assemblage is operatively coupled to the computer-readable memory and includes instructions that, when executed by the processing unit, cause the system to perform the method of any of paragraphs B1-B7.

C1. A video input device in a bandwidth-limited video transport system, the video input device comprising:
  a video input port, configured to receive an input video stream that has an input image resolution, an input frame rate, an input compression factor, and an input bandwidth;
  a video output port, configured to transmit a bandwidth-limited video stream;
  a configuration module, programmed to receive a selection of an image resolution limit, a frame rate limit, and a compression factor limit, wherein the configuration module is programmed to perform at least one of (a) receive a selection of a bandwidth limit and (b) determine the bandwidth limit based upon the image resolution limit, the frame rate limit, and the compression factor limit;

a video scaling module, programmed to apply an image scale factor to a scaling operand video stream to produce a scaled video stream, wherein the scaled video stream has a scaled image resolution that is the image scale factor times an image resolution of the scaling operand video stream;

a video frame rate transformation module, programmed to apply a frame rate transformation factor to a frame-transformation operand video stream to produce a frame-reduced video stream, wherein the frame-reduced video stream has a transformed frame rate that is the frame rate transformation factor times a frame rate of the frame-transformation operand video stream;

a video compression module, programmed to apply a compression factor conversion to a compression operand video stream to produce a compressed video stream, wherein the compressed video stream has a compressed compression factor that is the compression factor conversion times a compression factor of the compression operand video stream; and a bandwidth limiting module, programmed to determine if the input bandwidth of the input video stream is greater than the bandwidth limit and to limit the input bandwidth of the input video stream by:
  determining a first-stage image resolution that is less than or equal to the image resolution limit, wherein the first-stage image resolution is equal to either the input image resolution or, if the input image resolution is greater than the image resolution limit, the scaled image resolution that is the image scale factor times the input image resolution;
  calculating a first-stage bandwidth based upon the first-stage image resolution and the input frame rate, and optionally the input compression factor;
  provided that the first-stage bandwidth is greater than the bandwidth limit:
    determining a second-stage frame rate that is equal to either the input frame rate or, if the input frame rate is greater than the frame rate limit, the transformed frame rate that is the frame rate transformation factor times the input frame rate and that is greater than or equal to the frame rate limit;
    calculating a second-stage bandwidth based upon the first-stage image resolution and the second-stage frame rate, and optionally the input compression factor; and
    provided that the second-stage bandwidth is greater than the bandwidth limit, determining a third-stage compression factor that is greater than or equal to a ratio of the second-stage bandwidth and the bandwidth limit, and is less than or equal to the compression factor limit; and
  adjusting the input video stream to produce the bandwidth-limited video stream by scaling according to the first-stage image resolution with the video scaling module, transforming frame rate according to the second-stage frame rate with the video frame rate transformation module, provided that the first-stage bandwidth is greater than the bandwidth limit, and compressing according to the third-stage compression factor with the video compression module, provided that the second-stage bandwidth is greater than the bandwidth limit.

C2. The video input device of paragraph C1 programmed to perform the method of any of paragraphs A1-A10.1.1 or any of paragraphs B1-B7.

C3. The video input device of any of paragraphs C1-C2, further comprising a computer-readable memory, a processing unit operatively coupled to the computer-readable memory, and a computer-readable storage media assemblage, wherein the computer-readable storage media assemblage is operatively coupled to the computer-readable memory and includes the configuration module, the video scaling module, the video frame rate transformation module, the video compression module, and the bandwidth limiting module.

C4. A bandwidth-limited video transport system comprising:
  the video input device of any of paragraphs C1-C3; and
  a video output device connected to the video input device by a bandwidth-limited link, wherein the video output device comprises:
    an output device video input port, configured to receive the bandwidth-limited video stream from the video input device via the bandwidth-limited link;
    an output device video output port, configured to transmit an output video stream configured for reception by a video destination;
    an output video decompression module, programmed to decompress the bandwidth-limited video stream to produce an uncompressed video stream;
    an output frame rate transformation module, programmed to apply an output frame rate transformation factor to the uncompressed video stream to produce an uncompressed, frame-transformed video stream; and
    an output video scaling module, programmed to apply an output image scale factor to the uncompressed, frame-transformed video stream to produce the output video stream.

C4.1. The system of paragraph C4, wherein the video output device further comprises an output restoration module that is programmed to determine the output frame rate transformation factor based on a frame rate of the bandwidth-limited video stream and a selected frame rate of the video destination, and optionally wherein the frame rate of the bandwidth-limited video stream is the second-stage frame rate.

C4.2. The system of any of paragraphs C4-C4.1, wherein the video output device further comprises an/the output restoration module that is programmed to determine the output image scale factor based on an image resolution of the bandwidth-limited video stream and a selected image resolution of the video destination, and optionally wherein the image resolution of the bandwidth-limited video stream is the first-stage image resolution.

C4.3. The system of any of paragraphs C4-C4.2, wherein the video input device is programmed to transmit input quality information to the video output device, wherein the input quality information includes at least one of the input image resolution, the input frame rate, the input compression factor, and the input bandwidth, wherein the video output device is programmed to receive the input quality information from the video input device.

C4.3.1. The system of paragraph C4.3, wherein the video output device further comprises an/the output restoration module that is programmed to determine the output frame rate transformation factor based on the input frame rate.

C4.3.2. The system of any of paragraphs C4.3-C4.3.1, wherein the video output device further comprises an/the output restoration module that is programmed to determine the output image scale factor based on the input image resolution.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

As used herein, the singular forms "a", "an" and "the" may be intended to include the plural forms as well, unless the context clearly indicates otherwise.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

INDUSTRIAL APPLICABILITY

The systems and methods disclosed herein are applicable to the communication, entertainment, and video production industries.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method performed by a video transport system, the method comprising:
  receiving an input video stream at a video input port of a video input device;
  configuring the video input device with a bandwidth limit, an image resolution limit, a frame rate limit, and a compression factor limit related to the input video stream, wherein a different bandwidth limit is allocated for each of a plurality of video streams; and
  responsive to determining, by a bandwidth limiting module of the video input device, that a bandwidth of the input video stream exceeds the bandwidth limit;
  scaling, using a video scaling module of the video input device, an image resolution of the input video stream by an image scale factor less than one to create a reduced image resolution;
  producing, by the bandwidth limiting module, a first-stage bandwidth of a scaled video stream with the reduced image resolution, an input frame rate and an input compression factor of the input video stream;
  responsive to determining, by the bandwidth limiting module, that (i) the first-stage bandwidth is still greater than the bandwidth limit, (ii) the input frame rate is greater than the frame rate limit, and (iii) the input compression factor is less than the compression factor limit, transforming the input frame rate by a frame rate transformation factor less than one to create a second-stage bandwidth of an adjusted video stream with the reduced image resolution, the transformed frame rate and the input compression factor;

responsive to determining, by the bandwidth limiting module, that the second-stage bandwidth is still greater than the bandwidth limit and the input compression factor is less than the compression factor limit, applying a compression factor to the adjusted video stream by multiplying the input compression factor by the compression factor, wherein the compression factor is less than the compression factor limit to create a modified video stream; and responsive to the modified video stream being compatible with the bandwidth limit, outputting, by an output port, the modified video stream.

2. The method of claim 1, wherein receiving the input video stream includes receiving a compressed video stream with the input compression factor greater than unity and decompressing the compressed video stream to form the input video stream with the input compression factor being unity.

3. The method of claim 1, wherein the image resolution limit includes an image width limit and an image height limit, wherein the image resolution includes an image width and an image height, and wherein determining the reduced image resolution includes determining the image scale factor by calculating a minimum value of a ratio of the image width limit to the image width and a ratio of the image height limit to the image height.

4. The method of claim 1, wherein the image resolution limit includes a pixel number limit and the image resolution includes a pixel number, and wherein the determining the reduced image resolution includes determining the image scale factor by calculating a square root of a ratio of the pixel number limit to the pixel number.

5. The method of claim 1, wherein the input frame rate includes determining the frame rate transformation factor by calculating a ratio of the bandwidth limit to the bandwidth.

6. The method of claim 1, wherein the input video stream has a bits-per-pixel, wherein the image resolution includes a pixel number.

7. The method of claim 6, wherein the input frame rate includes determining the frame rate transformation factor by calculating a ratio of the bandwidth limit to a product of the pixel number, the input frame rate, and the bits-per-pixel.

8. A method performed by a video transport system, the method comprising:
receiving an input video stream at a video input port of a video input device;
configuring the video input device with a bandwidth limit, an image resolution limit, a frame rate limit, and a compression factor limit related to the input video stream, wherein a different bandwidth limit is allocated for each of a plurality of video streams; and
responsive to determining, by a bandwidth limiting module of the video input device, that a bandwidth of the input video stream exceeds the bandwidth limit;
scaling, using a video scaling module of the video input device, an image resolution of the input video stream by an image scale factor less than one to create a reduced image resolution;
producing, by the bandwidth limiting module, a first-stage bandwidth of a scaled video stream with the reduced image resolution, an input frame rate and an input compression factor of the input video stream;
responsive to determining, by the bandwidth limiting module, that (i) the first-stage bandwidth is still greater than the bandwidth limit, (ii) the input frame rate is greater than the frame rate limit, and (iii) the input compression factor is less than the compression factor limit, transforming the input frame rate by the input frame rate to create a second-stage bandwidth of an adjusted video stream with the reduced image resolution, and the input compression factor; and responsive to determining, by the bandwidth limiting module, that the second-stage bandwidth is still greater than the bandwidth limit and the input compression factor is less than the compression factor limit, applying the input compression factor to the adjusted video stream by multiplying the input video stream by the input compression factor to create a modified video stream; and responsive to the modified video stream being compatible with the bandwidth limit, outputting, by an output port, the modified video stream.

9. The method of claim 8, wherein the input video stream is an uncompressed video stream with the input compression factor being unity.

10. The method of claim 8, wherein receiving the input video stream includes receiving a compressed video stream with the input compression factor greater than unity and decompressing the compressed video stream to form the input video stream with the input compression factor being unity.

11. The method of claim 8, wherein the image resolution limit includes an image width limit and an image height limit, wherein the image resolution includes an image width and an image height, and wherein determining the reduced image resolution includes determining the image scale factor by calculating a minimum value of a ratio of the image width limit to the image width and a ratio of the image height limit to the image height.

12. The method of claim 8, wherein the image resolution limit includes a pixel number limit and the image resolution includes a pixel number, and wherein determining the reduced image resolution includes determining the image scale factor by calculating a square root of a ratio of the pixel number limit to the pixel number.

13. The method of claim 8, wherein the input frame rate includes determining a frame rate transformation factor by calculating a ratio of the bandwidth limit to the bandwidth.

14. The method of claim 8, wherein the input video stream has a bits-per-pixel, wherein the image resolution includes a pixel number.

15. The method of claim 14, wherein the input frame rate includes determining a frame rate transformation factor by calculating a ratio of the bandwidth limit to a product of the pixel number, the input frame rate, and the bits-per-pixel.

16. The method of claim 8, further comprising:
scaling the input video stream according to the image scale factor to form the scaled video stream.

17. The method of claim 16, wherein the scaling of the input video stream further includes transforming the scaled video stream to the input frame rate to form a transformed video stream with the image resolution.

18. The method of claim 17, wherein the scaling the input video stream further includes compressing the transformed video stream to the input compression factor to form the transformed video stream with the image resolution, the input frame rate, and the input compression factor.

19. The method of claim 8, wherein a video output port is configured to output the input video stream to the bandwidth limit.

20. The method of claim 8, wherein a configuration module is configured to receive the image resolution limit, the frame rate limit, and the compression factor limit for the input video stream.

* * * * *